Fig. 1.

INVENTORS.
Merlyn L. Hanson &
Charles D. Tabor, Jr.

ATTORNEY

INVENTORS.
Merlyn L. Hanson &
Charles D. Tabor, Jr.

BY

ATTORNEY

INVENTORS.
Merlyn L. Hanson &
Charles D. Tabor, Jr.
BY
ATTORNEY

INVENTORS.
Merlyn L. Hanson &
Charles D. Tabor, Jr.

ATTORNEY

INVENTORS.
Merlyn L. Hanson &
Charles D. Tabor, Jr.

ATTORNEY

Fig. 15.

INVENTORS.
Merlyn L. Hanson &
Charles D. Tabor, Jr.

ATTORNEY

Fig. 16.

INVENTORS.
Merlyn L. Hanson &
Charles D. Tabor, Jr.

ATTORNEY

INVENTORS
Merlyn L. Hanson &
Charles D. Tabor Jr.

BY

ATTORNEY

United States Patent Office 3,012,139
Patented Dec. 5, 1961

3,012,139
AUTOMATIC MASS SPECTROMETER
Merlyn L. Hanson, Ross County, and Charles D. Tabor, Jr., Jackson, Ohio, assignors to the United States of America as represented by the United States Atomic Energy Commission
Filed Mar. 24, 1960, Ser. No. 17,442
11 Claims. (Cl. 250—41.9)

This invention relates to mass spectrometers and more particularly to a mass spectrometer capable of continuous automatic operation and suitable for analyzing process samples from a production system containing gases whose content may be continuously changing, or for analyzing samples from a laboratory or other source.

Efficient analytical control of some experiments requires frequent, sometimes continuous, monitoring of the isotopic composition of a flowing gas stream. In the sampling and analyzing of process gases for quality control or other purposes it has been the practice to periodically extract samples of gas from the process stream and feed them to a manually operated mass spectrometer for isotopic analyses of the contents. A skilled analyst using a Nier type mass spectrometer can make four isotopic analyses of a process gas stream containing uranium hexafluoride each hour. These analyses put a strain on the operator and are subject to inaccuracies resulting from the human error, particularly during times when the operator is suffering from fatigue. Other problems include the necessity for having at least one operator on each shift the analyzer is used, and inability to operate the spectrometer in case of chemical release.

Applicants, with a knowledge of the problems of the prior art, have for an object of their invention the provision of a mass spectrometer that will automatically extract samples from a process gas stream and perform an isotopic analysis thereon, recording the results thereof for interpretation.

Applicants have as another object of their invention the provision of an automatically operated mass spectrometer which will increase the isotopic analysis productivity of the analyst and significantly reduce variations of the analysis results.

Applicants have as another object of their invention the provision of an automatically operated mass spectrometer capable of making a large number of successive determinations on a given sample which can be carried out under laboratory conditions with purified samples and controlled pressures, thereby reducing the number of variables which influence spectrometer operation.

Applicants have as a further object of their invention the provision of an automatically operated mass spectrometer which will reexamine and reanalyze the gas sample automatically when the results are unsatisfactory.

Applicants have as a still further object of their invention the provision of an automatically operated mass spectrometer for the analysis of uranium samples which makes measurement of the relative proportion of one isotope with respect to another by making a series of measurements of the relative abundance of one isotope of a sample and recording them so that they may be extrapolated back to the time of the measurement of the other isotope for comparison.

Applicants have as a still further object of their invention the provision of an automatically operated mass spectrometer particularly adapted for process control in a system for separating the isotopes of uranium so that the times and rates of product withdrawal can be chosen.

Other objects and advantages of this invention will appear from the following specification and accompanying drawings, and the novel features thereof will be particularly pointed out in the annexed claims.

Applicants have applied their control system to a conventional mass spectrometer of the Nier type as modified by the General Electric Company, but any suitable mass spectrometer could be used for the purpose.

The control system was intended to accomplish the following principal functions: (a) Trap a gas sample to be analyzed, (b) Maintain the ion beam intensity during analysis, (c) Adjust the spectrometer magnetic field strength or ion accelerating voltage to focus the selected ion beam on the collector slit, (d) Provide appropriate reference voltages to balance the voltages produced by subsequent ion beams, and (e) Record the results.

In one form, the control system was required, (1) to set up a voltage equal to that produced by the selected ion beam to within .10 percent, (2) to measure the relative magnitudes of selected ion beam currents to within .10 percent, (3) to produce a given intensity level to within 2 percent, and (4) to maintain the ion beam intensity constant to within .10 percent during analysis, although extrapolation may be employed to extend the tolerance to drifts in intensity of .5 percent.

Ordinarily, analysis cannot be made of the process stream directly since variations of the content which take place between the times at which the $U^{235}$ and $U^{238}$ peaks are in focus may introduce errors in the observed results. Although applicants' system is capable of making measurements on untrapped samples during periods of good stream stability, in the normal uranium process stream, the rate of change in partial pressure of impurities may be as high as one percent per minute which is high enough to prevent completion of the analysis. Therefore, it is generally necessary to trap the sample to be analyzed and isolate it from fluctuations in the composition and pressure of the product stream. To accomplish this, the selection of the valve type may have importance, particularly where the process gases are corrosive in nature. It is preferably solenoid or pneumatically operated, lending itself readily to automatic control. For best results, it should also be small and compact, vacuum tight, and resistant to corrosion and have good seating properties.

The sensitivity of the measuring system is somewhat dependent on the size of the ion currents. Intensity is complicated by the fact that the ion beams of the spectrometer are swept back and forth across the collector slit so that the signals striking the collector plates are constantly changing even when the total intensity is constant. Therefore, sample flow is preferably adjusted before the beginning of measurements and depended upon to remain substantially constant.

The resulting drift during measurements was found to be substantially linear so that in comparing a $U^{235}$ peak, for instance, with a $U^{238}$ peak, the $U^{235}$ peak was first scanned, and a series of $U^{238}$ peaks were successively recorded so that the drift could be observed, and the $U^{238}$ peak extrapolated back to the time the $U^{235}$ peak was observed.

This procedure placed a limitation on the time available for analysis. The rate of scanning must be sufficiently slow to permit the measuring system to follow the beam to the peak and to permit the servo-mechanism to set up a voltage to balance that produced by the ion beam peak, and the range of scanning was made sufficient to insure the observation of the peaks. Scanning rates of one mass unit or less per minute proved to be adequate. However, at this scanning rate the time required to scan the interval between peaks of beams of certain masses was too long to maintain constant ion intensity. So a portion of the sweep between masses was eliminated by scanning up to the peak of one beam, then switching or skipping the interval between, and continuing the scan from a point near the peak of the next beam.

Figure 1:
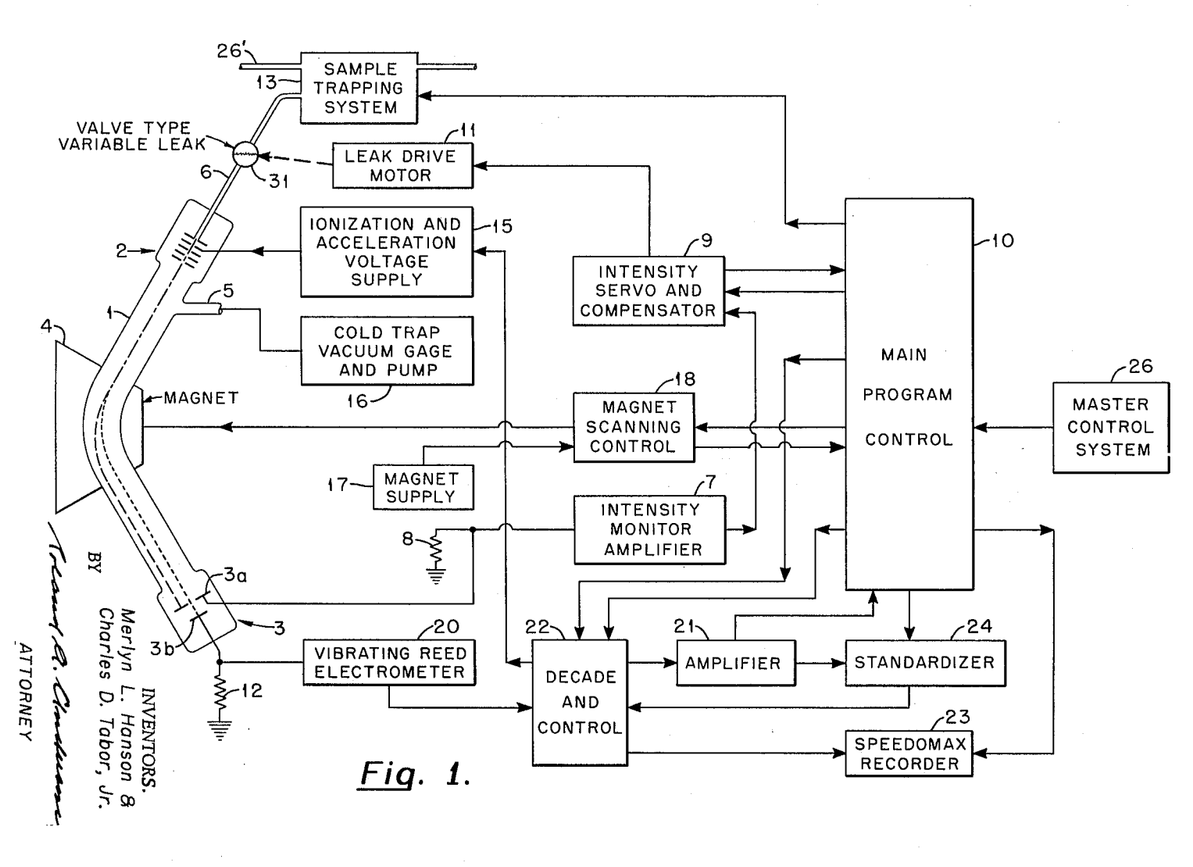
FIGURE 1 is a block diagram of our improved automatic mass spectrometer system.

Referring now to the drawings in detail, and particularly to FIGURE 1, the tube of a conventional mass spectrometer is designated 1 and includes a source 2 at one end and a collector assembly 3 at the other. The usual 60° wedge-shaped beam-deflecting magnet 4 is shown at the bend in the tube, and the extension 5 is adapted to be coupled to a vacuum pump and cold trap for maintaining appropriate pressure conditions within the tube. Samples of gases are fed to the source 2 through the sample tube 6 for analysis, and are ionized, collimated and accelerated along the tube 1 by a potential gradient impressed upon the plates of the source 2 in the usual manner. The stream of ions upon reaching the region of magnet 4 is separated into beams according to mass, and where the sample contains $UF_6$, beams $U^{235}F^+_5$ and $U^{238}F^+_5$ are included. The separate beams then travel on down the tube toward the collector asembly and normally strike the large slotted plate 3a. However, if the magnet 4 is properly adjusted to select a predetermined ion beam and focus it on the slit in the upper control plate 3a, the selected beam will pass through the slit and strike lower collector or signal plate 3b. The resulting ion current can be measured and serves as an indication of the relative abundance of the selected isotope or substance. This is the normal operation of the conventional mass spectrometer, and is usually carried out by a series of manual adjustments by a highly skilled analyst or operator. These manual adjustments include changes in sample flow, ionization and accelerating potential, magnet supply current for the scanning magnet, and the various control circuits that measure and record the peaks.

Elements of the automatic system, some of which are needed for manual operation, include an intensity monitor amplifier 7 coupled to slotted control plate 3a through a resistor 8 to ground. Amplifier 7 feeds intensity servo and compensator 9 which is coupled to the program control 10 for controlling the operation of the leak drive motor 11 which operates valve type variable leak 31 to control the flow of sample gas from the sample trapping system 13 to the sample tube 6.

The sample trapping system 13 is adapted to communicate with a process line 26' or other sample source, and is coupled to program control 10 which controls the removal and retention of samples from the process stream.

Intensity control is accomplished by comparing the signal from intensity monitor amplifier 7 with a reference voltage in the intensity servo and compensator 9, and the resulting signal is employed to drive the leak drive motor 11 which operates a sensitive wedge-and-lever system to position the needle of a valve which functions as a leak.

The ionization and accelerating voltage supply 15 for source 2 is coupled into and is controlled by the decade and control 22 and in turn by the program control 10. Extension 5 of the spectrometer tube communicates with a conventional cold trap and vacuum gauge and pump 16 for evacuating the tube and maintaining it at a proper pressure level.

Magnet supply 17 is employed to provide exciting current for spectrometer magnet 4 and is coupled to magnet scan control 18 which is, in turn, coupled to the program control 10 for controlling the magnet current supplied to the magnet 4 to shift the various beams in the tube 1 with respect to the slit in the plate 3a for focusing. The relationship of mass to scanning resistance is such that mass decreases as resistance is increased, so that a shift from mass $U^{235}F^+_5$ to mass $U^{238}F^+_5$ can be accomplished by the removal of some predetermined resistance in series with the scanning potentiometer. In the magnet control, such a resistance is provided, called the "separation control," so that a shift can be made from the $U^{235}$ peak to any selected point in the vicinity of the $U^{238}$ peak.

Signal collector 3b is coupled through grounded resistor 12 to electrometer 20 which feeds the decade and control 22 and is also coupled to amplifier 21 and to standardizer 24 and recorder 23. The decade and control 22 contains the bucking battery and circuits for coupling into the standardizer 24, decade and other resistors for the measuring arrangements, and switching relays for the recorder 23 and standardizer 24.

In one form the electrometer 20 used was one of the vibrating reed type, the amplifier 21 was a Brown Instrument Company servo amplifier, and the recorder was a Leeds and Northrup Speedomax Strip Chart recorder. However, other components of equivalent characteristics perform these functions just as satisfactorily.

The standardizer 24 is the heart of the measuring system. After sufficient ion current stability is attained, the magnet current is decreased so that the $U^{235}$ ion beam is swept across the slit in control collector 3a to fall on signal collector 3b. As the ion current increases, the moving contact of the standardizing potentiometer is advanced as long as the ion current signal increases. After reaching the peak, the standardizer motor is reversed, the potentiometer drive mechanism is disengaged but the potentiometer tap remains at its maximum. The voltage developed by the standardizer battery across this position of the potentiometer is thus a measure of the maximum voltage developed during sweeping of the $U^{235}$ peak. A portion of this voltage is held for subsequent comparison with the $U^{238}$ measurements.

The sequence of operations is carried out in the desired order and at the proper time by a program control 10, including a twenty position stepping switch, relays, and timing devices, and circuits for making corrections for abnormal occurrences.

Finally, the master control system 26 is coupled to the program control 10 to indicate the status of operations, supply power, and activate various steps in the program.

Figures 2, 3, 4, 8, 10:
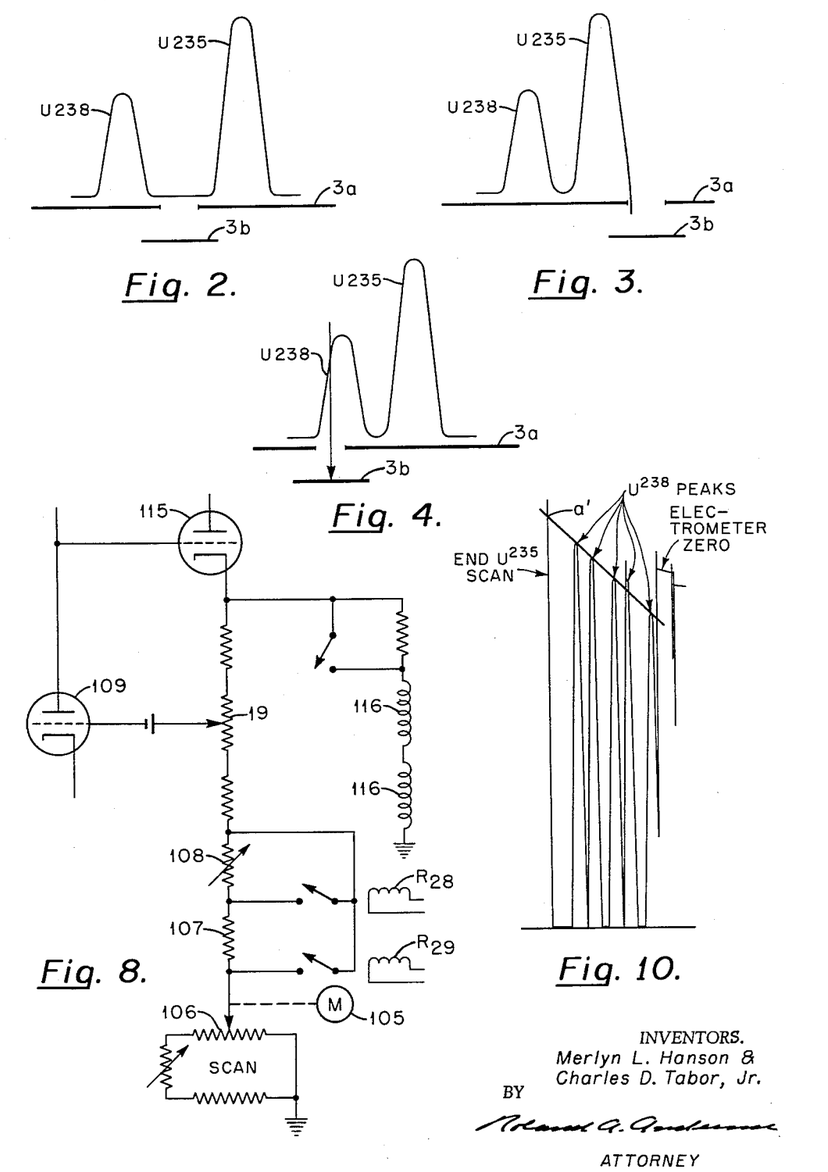
FIGURE 2 is a schematic showing the position of the $U^{235}$ and the $U^{238}$ beams with respect to the collector slit during the intensity control period.
FIGURE 3 is a schematic of the same beams at the commencement of the $U^{235}$ scan.
FIGURE 4 is a schematic of the beams at the beginning of the $U^{238}$ scan.
FIGURE 8 is a diagram of portions of the magnet supply and the magnet supply control.
FIGURE 10 is a section of chart showing the $U^{235}$ peak, a series of $U^{238}$ peaks, and the extrapolation line joining the $U^{238}$ peaks.

In its operation, a sample of process gas is removed from line 26' and trapped and isolated by the sample trapping system 13. This is leaked into sample tube 6 through the valve type variable leak 31 controlled by the leak drive motor 11 and the intensity monitor amplifier 7 which responds to signal from ion currents that strike upper slotted plate 3a. During this intensity control period the valley of the ion beams lies across the collector slit as shown in FIGURE 2, so ion current from both beams falls on the upper control collector 3a. Once the intensity of the beam is adjusted to the proper level, the motor 11 ceases to operate and the adjustment is maintained throughout the analysis. During the initial intensity control period which has a duration of about 4½ minutes, the ion source is stabilized, the zero of the measuring system is checked, and other controls, including the standardizer and scanning system, are set to the proper level for the initiation of measuring steps to follow. Then if uranium is under analysis, the $U^{235}$ period follows, in which the $U^{235}$ beam is first positioned to the left of the collector slit as shown in FIGURE 3, by switching the separation resistance into the magnet scan control circuit 18, and then swept across the collector and measured. During this sweep, ion currents to the lower signal collector 3b are measured by the vibrating reed electrometer 20, and decade and control 22, which through amplifier 21 drives standardizer 24 clockwise to raise the potentiometer voltage supplied to the decade and control 22 as a reference voltage. This continues until the $U^{235}$ peak is reached and measured by the recorder 23. After the peak is reached, standardizer 24 stops and locks itself at that point. Thereafter, a portion of the reference voltage supplied from the potentiometer of the standardizer, and corresponding to the $U^{235}$ peak ion current signal, is employed for comparison with the $U^{238}$ signals. The recorder 23 functions as a self balancing potentiometer, balancing against the reference voltage.

After the standardizer 24 has followed the $U^{235}$ beam to the peak and stopped, the separation resistance in the circuit of the magnet scan control 18 is shorted, causing the ion beams to be shifted to the right past the $U^{235}$ peak, as shown in FIGURE 4, so that the $U^{238}$ beam is positioned over the slit in upper control plate 3a near the peak. During this operation, the standardizer remains inoperative, but measurement of the $U^{238}$ peak is delayed for a short time to permit the magnetic field of the spectrometer magnet 4 to stabilize after the separation resistance is changed. Thereafter, as the program control 10 continues to operate, the magnetic scan control 18 proceeds to sweep the $U^{238}$ beam back and forth across the collector slit a plurality of times so that a series of measurements may be made of the ion beam.

In the foregoing, if the $U^{235}$ peak is not accepted either by reason of being too large or too small, the sequence is interrupted before measurement of the $U^{238}$ peaks and the set point of the intensity control system is adjusted in response to the demand of the acceptance switches in the standardizer 24 and the program control 10, and a new intensity control period of one minute duration is initiated before further measurement of the $U^{235}$ peak is attempted. If accepted, the sequence proceeds to completion with a series of measurements of the $U^{238}$ peaks. Also, in case of emergency, as where the limit of the magnet scan was reached without the appearance of the $U^{235}$ peak, the sequence would be interrupted, and a new 4½ minute intensity control period would precede the new sequence.

Figure 11:
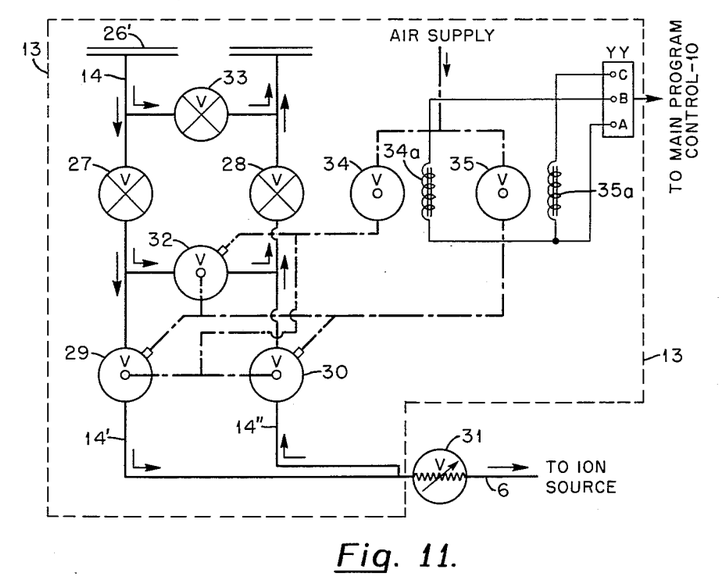
FIGURE 11 is a schematic of the sample trapping system.

Referring now to FIGURES 5 through 19, showing the circuit connections, components and charts for the system, the sample trapping system 13 of FIGURE 11 includes a line 14 for communication with the process stream of main 26', through the loop which includes valves 27, 29, 30 and 28 and past the leak 31. Interposed across the loop is valve 33 and bridging a portion thereof is valve 32. Pneumatic valves 29, 30 and 32 are operated by pneumatic pressure from valves 34, 35 actuated by solenoids 34a, 35a.

Figure 12:
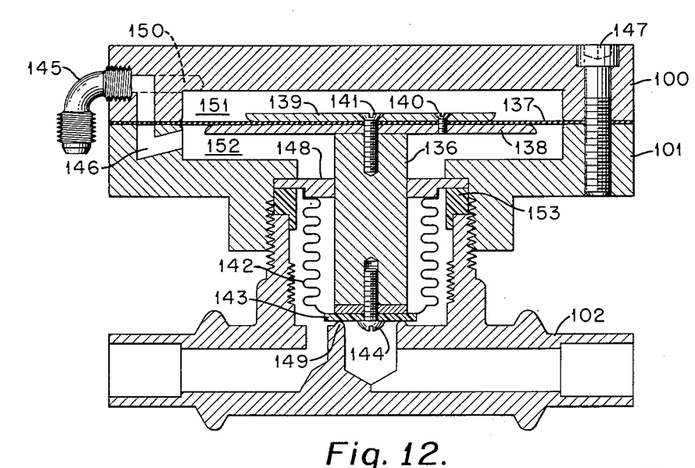
FIGURE 12 is a sectional elevation of the type of valve employed in the sample trapping system.

One form of pneumatic valve suitable for use in the sample trapping system 13 is shown in FIGURE 12. Base 102 has a bore for passage of gases and seat 149. Threaded on the base 102 is an upper two-part housing 100, 101 which is assembled by stud 147 and sealed by the edges of a rubber diaphragm 137 which carries a valve stem 136 mounted thereon by upper and lower plates 139, 138 through which screw 141 passes and seats in stem 136 to form upper and lower air or gas chambers 151, 152, supplied through ports 150, 146 respectively through separate fittings of type 145. The lower chamber is separated from the process gas by bellows 142 joined to insert ring 148 held in place by fluorothene gasket 153, and at the other end to stem 136 by fluorothene seat 143 carried by stem 136 by screw 144. This valve has the desired characteristics outlined above in that it is easily adapted to automatic operation, is small, compact, vacuum tight, resistant to corrosion, and has good seating properties.

Figure 13:
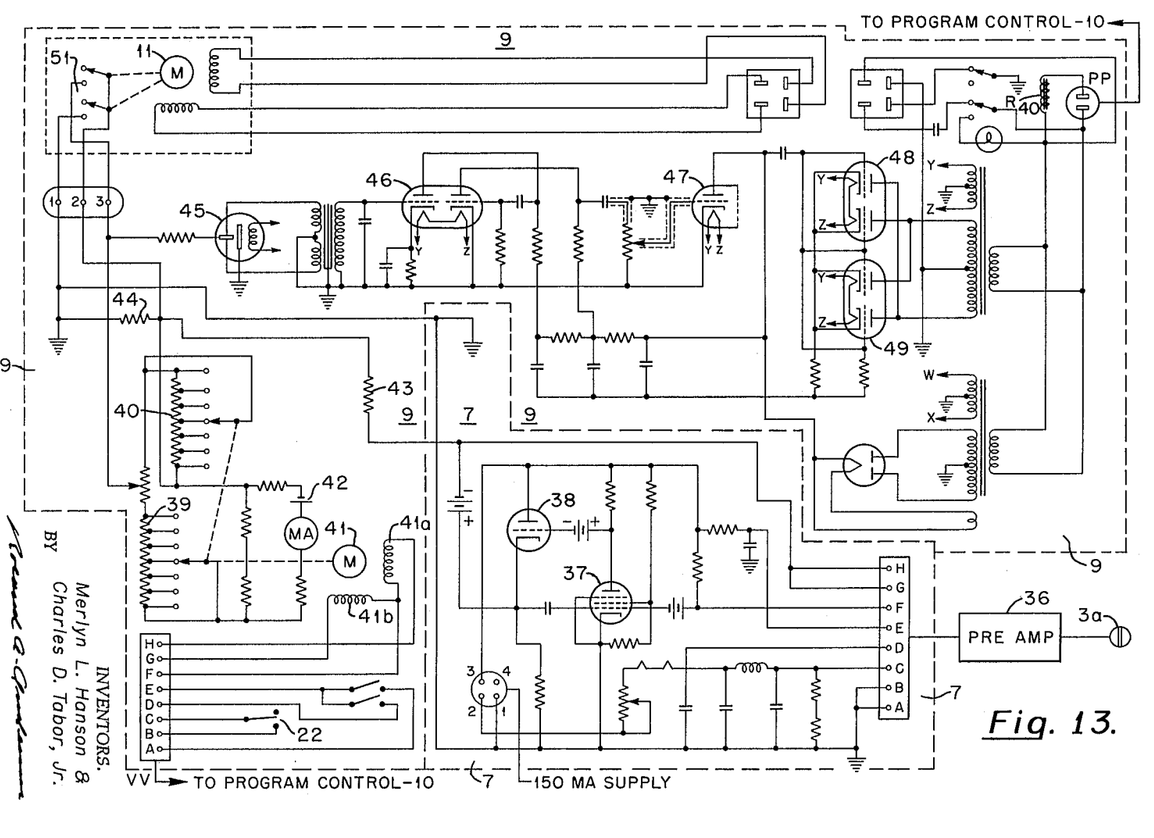
FIGURE 13 is a schematic of the intensity servo and compensator and the leak drive motor.

The intensity monitor amplifier 7, shown in FIGURE 13, is comprised of a preamplifier 36, fed from the upper slotted spectrometer control plate 3a. This feeds into a D.C. amplifier having two stages 37 and 38 coupled in a conventional manner. The output of intensity monitor amplifier 7 feeds the intensity servo and compensator 9, as shown in FIGURE 13. It comprises gang voltage dividers 39, 40 whose wiper arms are driven by a motor 41, preferably of the 1 r.p.m. type, controlled by the program control 10. The voltage dividers 39, 40 are bridged across battery 42 or other reference source, and provide a bucking potential which is coupled to resistors 43, 44 in opposition to the signal from intensity monitor amplifier 7, and the difference in potential or resultant signal, is applied through a chopper 45, which may take the form of a Brown voltage converter, to a conventional servo-amplifier having stages 46, 47, 48 and 49 coupled to leak drive motor 11 for driving it to regulate the leak 31. Since several masses may register on the upper control plate 3a at one time, the reference voltage will be adjusted to a value which will take into account the ratio of one element or isotope to the total collector current. The effects of subsequent changes in this ratio due to pressure changes, impurities, etc., are nullified by the automatic intensity control compensator 39, 40, 41, 42. Motor 11 not only actuates the leak valve, but also operates limit switches 51.

Figure 5:
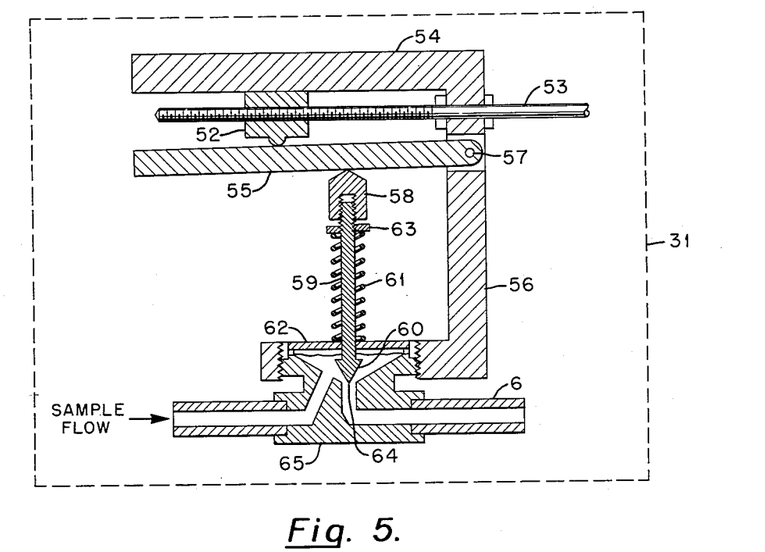
FIGURE 5 is a sectional elevation of the intensity control valve leak.

One suitable type of leak valve 31 is shown in FIGURE 5, wherein a screw driven wedge 52 has an internally screw threaded bore for passage and coaction with an externally screw threaded shaft 53. This wedge moves between a fixed bar 54 and a hinged bar pivoted on upright support 56 at 57. Pivoted bar 55 rests upon head 58 mounted on the upper end of stem 59 of a spring-loaded diaphragm valve so as to effect a small movement in the valve needle 60 for each revolution of the rod 53. Compression spring 61 serves as the loading spring and is interposed between disk 62 and spring followers 63 and permits the free passage of the stem or spindle of valve 59 which engages the seat 64 in body 65. The upright support 56 is screw threadedly mounted on an extension of valve body 65.

It is desirable that there be a minimum volume in the sample tube 6 between the leak 31 and source 2 in order to minimize the time delay between the adjustment of leak 31 and the response of amplifier 7. Since this response time is significantly long, a high servo gain with no dead zone invariably results in a tendency toward "hunting." This condition should be avoided, since the amplifier output lags behind variations in leak adjustment and since the leak must necessarily require some time to act. A suitable determination of correct gain can usually be made by adjusting the gain control to a point where the dead zone is approximately 2 percent of the reference voltage, as indicated by two points on either side of balance, where the leak driving motor starts to "creep."

Figure 16:
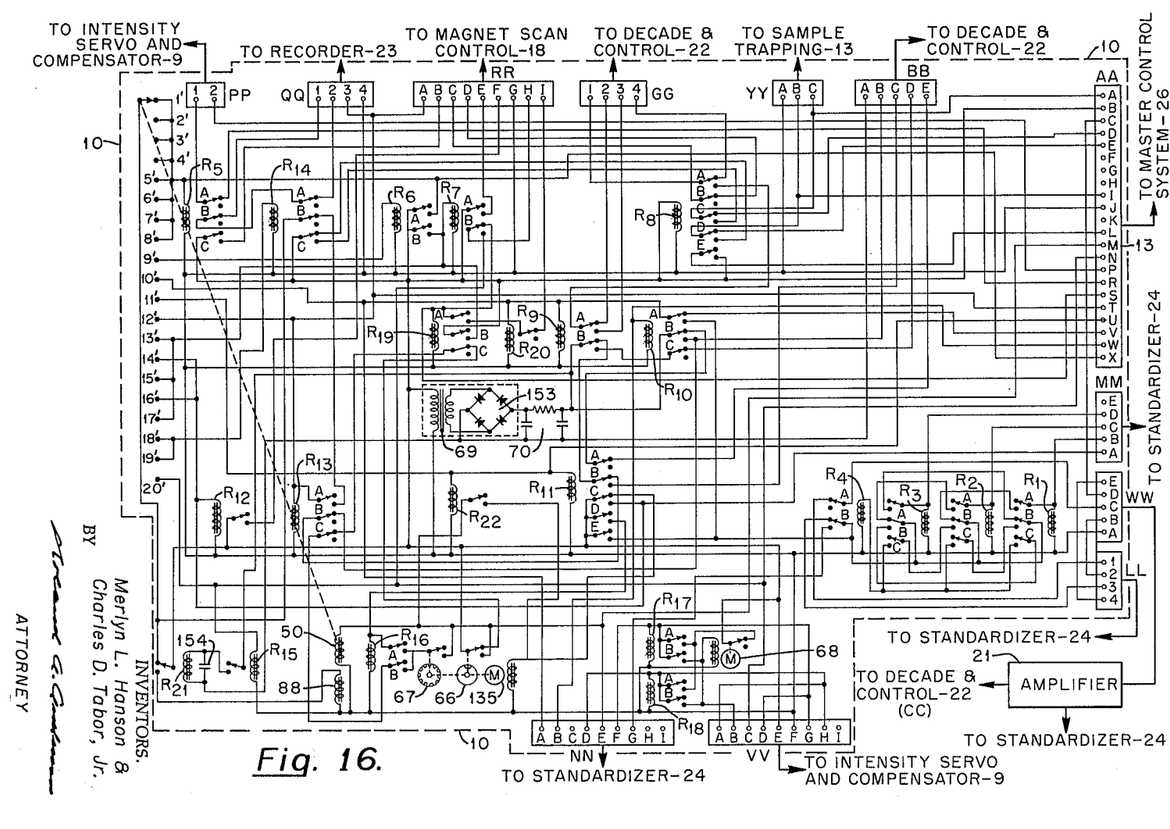
FIGURE 16 is a schematic of the program control.

The program control 10, shown in FIGURE 16, comprises a stepping relay 50 which includes a solenoid which operates a wiper or stepper that moves over twenty stationary contacts designated 1' through 20'. During the 4½ minutes normally required for the stepper or wiper to traverse the first nine contacts designated 1' through 9', an intensity control period takes place. Then on contact 10', the spectrometer beam is deflected away from the source exit slit while a zero measurement is taken by the recorder 23 and the standardizer 24 positions or repositions itself at zero. On contact 11' a $U^{235}$ standardizer period occurs beginning with the $U^{235}$ beam in the position shown in FIGURE 3, and as it is swept across the slit in the upper control collector 3a, the standardizer follows it to the peak. On contact 12', the $U^{238}$ beam is shifted across the slit of the upper collector 3a to a point beyond the peak as indicated in FIGURE 4, and then the peak is swept across the slit. On contact 13' the peak is swept across the slit in control plate 3a in the opposite direction, and on contacts 13' to 17' the $U^{238}$ beam continues to be swept back and forth across the collector slit. On contacts 18' and 19' the sample is changed by sample trapping system 13 which releases the old one and extracts a new one from the process stream. When contact 20' is reached the system is reset.

Relays within the program control 10 that control the sequence of operations of the system include manual to automatic relay $R_8$ for the sample trapping system 13, intensity control relays $R_5$ and $R_6$, scan motor reference relay $R_7$, the peaks-in-peaks-out, beam deflection and recorder control relay $R_9$, standardizer control relay $R_{10}$, $U^{235}$ period control relays $R_{11}$ and $R_{22}$, emergency sweep relay $R_{19}$, control relays $R_{17}$ and $R_{18}$, timer switch control relay $R_{16}$, stepping period control relay $R_{13}$, and sample trapping relay $R_{14}$, and standardizer controlled, anti-clockwise operated and blocking circuit relays including $R_1$, $R_2$, $R_3$ and $R_4$. During clockwise rotation of the standardizer 24, described hereinafter, when the ion current signal is increasing, relays $R_1$, $R_2$ and $R_3$ close in the order of $R_1$, $R_2$, $R_3$, $R_1$, etc., each relay closing once per revolution of the drive shaft. They are wired such that should any one relay close in a different order, i.e., $R_1$ after $R_2$ or $R_3$ after $R_1$, etc., relay $R_4$ will be energized and standardizer operation will be stopped. This normally occurs when the ion peak has been passed and the signal starts to decrease. Only the functions of relay $R_2$ will be discussed, since the other two are wired similarly in a closed ring system, and the explanation will apply in a similar manner to them.

Contacts $R_{2A}$, which serve as a holding circuit for relay $R_2$, are broken when relay $R_3$ is energized. Contacts $R_{2B}$, when relay $R_2$ is energized, form part of the energizing circuit for $R_4$ through contacts $R_{3C}$, and when relay $R_2$ is deenergized form part of the holding circuit for relay $R_1$. Contacts $R_{2C}$ form a circuit through contacts $R_{1B}$ to energize relay $R_4$. When relay $R_4$ is deenergized contacts $R_{4A}$ complete a circuit to one field 25b and contacts $R_{4B}$ to the other field 25a of the motor 25 of standardizer 24 of FIGURE 19. When relay $R_4$ is energized, contacts $R_{4A}$ open breaking the circuit to field 25b and contacts $R_{4B}$ shift to break the circuit to the other field 25a and complete a circuit to the acceptance switches in the standardizer 24 for determining what step in the sequence should follow the measurement of the $U^{235}$ ion beam.

Also included in the program control 10 is the motor 135 that drives the two stepping cams 66 and 67. The former contains a single indentation and actuates a switch in the stepper circuit to close the circuit once each revolution, while the latter has a plurality of indentations, preferably seven, and actuates a switch that controls the stepper by closing the circuit a plurality of times each revolution. When both cams are operating in the circuit, the indentations of the two cams are so spaced that they harmonize and do not function to open or close circuits that interfere with each other. In the preferred form, cam 67 is set to complete its sequence of operations just before cam 66 moves to the position for actuating its switch. Other elements of the program control 10 are the timer 68 that adjusts the compensator of the intensity servo and compensator 9 and the reset and advance relays $R_{15}$, $R_{21}$. In order for the stepping relay 50 to reset perfectly, the reset solenoid must be energized for almost a second. $R_{21}$ is a direct current relay shunted by a 4000 mfd. condenser 154 and is energized from the 8 volt D.C. supply including rectifier 153, filter 70 and transformer 69 by a 110 volt A.C. relay $R_{15}$ which closes for only a small fraction of a second when the stepper contact arm reaches contact 20'. This is necessary because the same D.C. current relay removes power from the stepper arm during the reset period. This avoids spurious action as the stepper passes back over the relay contacts.

Figure 15:
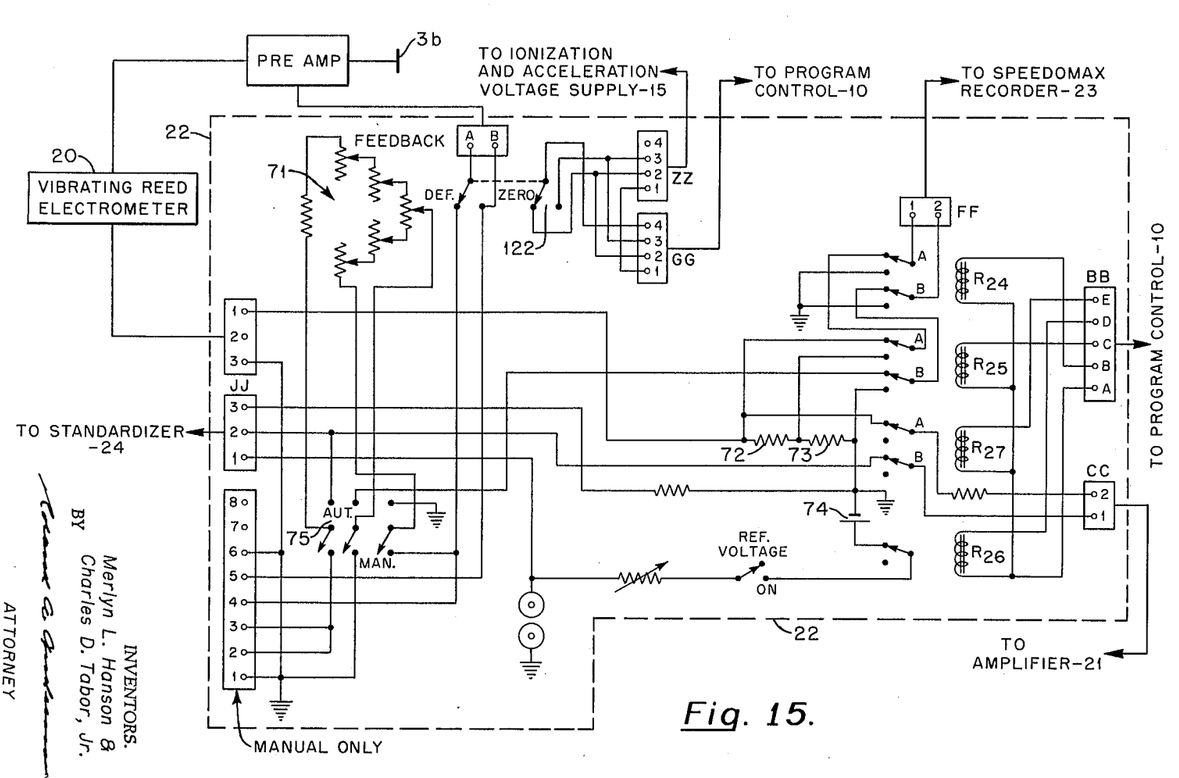
FIGURE 15 is a schematic of the decade and control.

The decade and control 22, shown in FIGURE 15, serves to coordinate the measuring and recording system recorder 23, the vibrating reed electrometer amplifier 20, and the standardizer 24, to permit measurement of the $U^{235}$ and $U^{238}$ ion currents, and to facilitate calibration. Relay $R_{24}$ serves to selectively switch the recorder 23 into the measuring circuit to record the $U^{235}$ and $U^{238}$ peaks and electrometer zero, or to remove it therefrom at other times. Relay $R_{25}$ serves to switch the recorder 23 across a shunt resistor 73 to measure the $U^{235}$ peak and across a bridge to measure the $U^{238}$ peaks. When energized, relay $R_{25}$ shunts the recorder 23 across a 6 ohm resistor 73 which is in series with a 1670 ohm resistor 72 to form a voltage divider which is fed by vibrating reed amplifier 20 to measure the relatively large $U^{235}$ peak. When deenergized, relay $R_{25}$ switches the recorder across a bridge to measure the $U^{238}$ ion currents. In the latter arrangement, recorder 23 is connected through contacts $R_{25A}$ across a voltage divider including resistors 72, 73 conected in series to ground so that ion current signal from amplifier 20 is fed thereto and the drop across resistors 72, 73 is coupled through contacts $R_{25A}$ to the recorder 23. Since battery 74 or other source is connected across the standardizer slide wire 76 of FIGURE 19, the potential supplied from the moving contact thereof passes through the automatic operations switch 75, if in the automatic position, to the decade 71, a resistance bank connected in series to form a potentiometer of preferably 10,000 ohms. The output of the moving contact thereof is then applied through the automatic operations switch 75 and contacts $R_{25B}$ to the other side of the recorder 23 in opposition to the ion current signal from the amplifier 20.

When relay $R_{27}$ is energized, it removes the input of the amplifier 21 which drives the standardizer 24 from the vibrating reed amplifier 20 and bridge, and when deenergized, couples them back in the circuit by placing the input of the amplifier 21 across the bridge, mentioned above, which includes the decade potentiometer 71 on one side and the voltage divider of resistors 72, 73 on the other. During the $U^{235}$ scan, that portion of the output of the vibrating reed electrometer amplifier 20 which appears across the resistors 72, 73 is balanced against the potential of the decade potentiometer 71 and the difference between these potentials is employed to control the slide-wire driving motor of the standardizer 24 by means of the amplifier 21, so that the slide wire continuously furnishes a potential equal to the voltage developed by the $U^{235}$ ion current. The standardizer 24 follows the $U^{235}$ signal as it increases, driving the slide wire to increase the bucking potential until the peak is reached. At this point the reference voltage from the slide wire is fixed for the duration of the subsequent $U^{238}$ ion beam current measurements, being applied to the decade 71 and recorder 23.

Relay $R_{26}$ serves to switch the bucking battery or reference source 74 into and out of the slide-wire potentiometer circuit. When energized, relay $R_{26}$ opens the circuit for the bucking battery 74, during the zero reading of the recorder 23.

Figure 19:
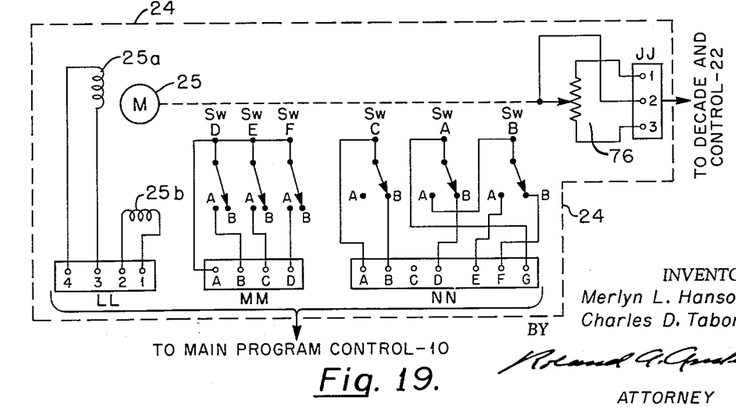
FIGURE 19 is a schematic of the standardizer.

The standardizer 24 of FIGURE 19 comprises a standardizer motor 25 with a quadrature field 25a and a control field 25b. Motor 25 is mechanically coupled to drive the moving contact of slide-wire potentiometer 76 and control the bucking voltage applied to the amplifier 21. The motor drive also carries a series of cams which open and close mechanically-operated switches SwD, SwE, SwF, SwC, SwA and SwB in a manner described hereinafter.

Figure 6:
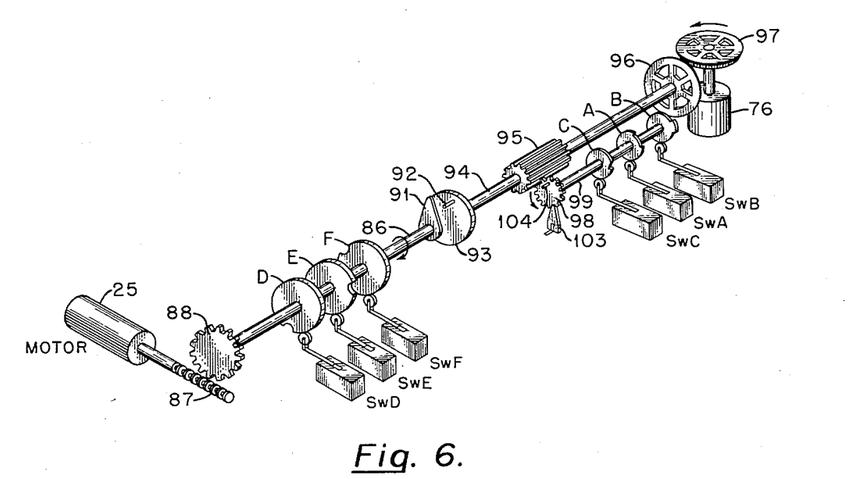
FIGURE 6 is a perspective of a portion of the standardizer mechanical operating structure.

FIGURE 6 shows the standardizer drive mechanism for actuating the above mechanically-operated switches. Shaft 86 is driven by a worm 87 on the shaft of standardizer motor 25 which meshes with gear 88. Cams D, E and F have indentations in their circumferential surfaces that receive the resilient or spring-pressed actuators on the arms of switches SwD, SwE and SwF, respectively, to actuate them in the usual manner when meshed therewith. Rigidly mounted on the free end of shaft 86 is a crank 91 which is adapted to engage and coact with pin 92 on disk 93 mounted on shaft 94 for rotating the latter shaft. Mounted on an intermediate portion of shaft 94 is gear 95, and on the other free end is mounted a bevel gear 96 which meshes with a mating gear 97 for driving the movable contact with respect to the slide-wire of potentiometer 76, which is preferably of the multi-turn type.

Gear 95 is adapted to mesh with a gear 98 on the free end of supplemental shaft 99. This shaft carries a series of cams C, A and B that operate switches SwC, SwA and SwB in a manner similar to that outlined above for switches SwD, SwE and SwF. Stationary mechanical stop 103 is adapted to engage with pin 104, carried by gear 98, to limit movement of the gear.

The slide wire 76 must remain fixed after the scan has passed the $U^{235}$ peak. This is made possible by the above arrangement which prevents the motor-driven shaft from rotating more than a fraction of a turn counterclockwise after having pushed the slide wire to its ultimate clockwise position, when viewed from the end opposite the gear. The switches SwD, SwE, and SwF nearest the standardizer motor 25 interpret the direction of rotation of the drive shaft 86. The arrangement of crank 91 and pin 92 provides a clutch with approximately 330° of free motion. This results from the fact that when the driving surface of crank 91 is in contact with the pin 92 on cam 93 at the end of the clockwise rotation, shaft 86 would have to rotate about 330° counterclockwise before the crank would again make contact to rotate shaft 94 in that direction. As indicated, cams D, E and F through switches SwD, SwE and SwF control the blocking system made up of relays $R_1$, $R_2$, and $R_3$ in program control 10. As long as these relays close in the order of $R_1$, $R_2$, $R_3$, etc., as they do when motor 25 produces a clockwise rotation of the slide wire 76 in response to an increasing ion current, relay $R_4$ remains deenergized. However, if the rotation of the shaft 86 changes from clockwise to counterclockwise, so that any two of the above relays close in the reverse sequence, the blocking relay $R_4$, is energized, removing power from the standardizer motor 25. Shaft 86 must rotate counterclockwise 120° to 240° before the blocking relay will close, allowing the sweep to reach and pass the top of the $U^{235}$ peak during a standardizing scan. This flexibility protects the standardizer from becoming disabled prematurely by random fluctuations in the amplifier output. The closure of relay $R_4$ serves not only to prevent the standardizer 24 from following the output of amplifier 21 as it drops off from the $U^{235}$ peak but, also, since it represents the end of the useful $U^{235}$ scanning time, provides a potential to start either a $U^{238}$ scan or an intensity control period.

Figure 18:
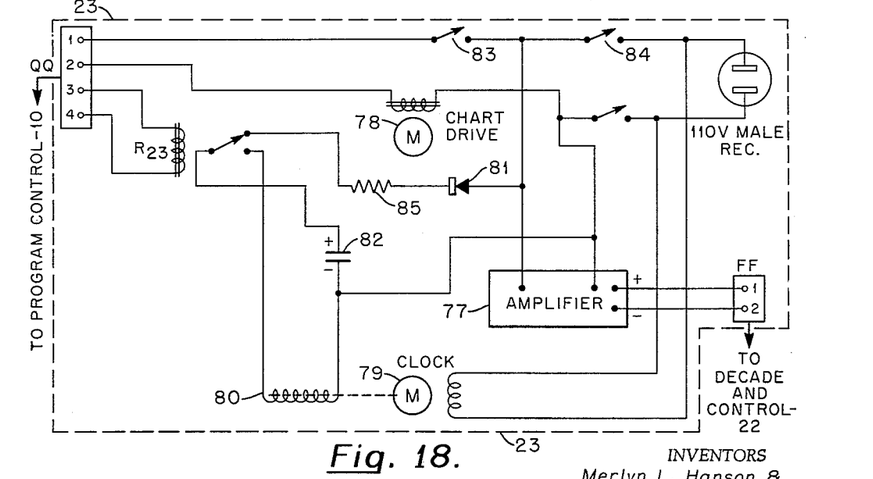
FIGURE 18 is a schematic of the recorder.

Although Leeds and Northrup "Speedomax" recorder 23, shown in FIGURE 18, was used as the recorder, any other suitable type may be employed. It is fed from the decade and control 22 and its operation is controlled by the program control 10. It is modified to include a clock motor 79, printing solenoid 80 and rectifier 81 for periodically charging condenser 82, all controlled by relay $R_{23}$ for stamping the time on the time chart. Chart drive motor 78 moves the chart paper to be stamped, and manual switch 83 serves to complete the circuit to energize it. Amplifier 77 is energised by closing switch 84 to operate the chart marker or stylus. Separate switches 83 and 84 permit the amplifier to warm up before the chart motor is started. Relay $R_{23}$, when deenergized, completes the circuit to charge condenser 82 through rectifier or diode 81 and resistor 85 from the A.C. power source. When energized, relay $R_{23}$ breaks this charging circuit and completes the discharge circuit through the winding of printing solenoid 80 to momentarily actuate it and stamp the time, as shown by clock motor 79, on the recorder chart.

Figure 14:
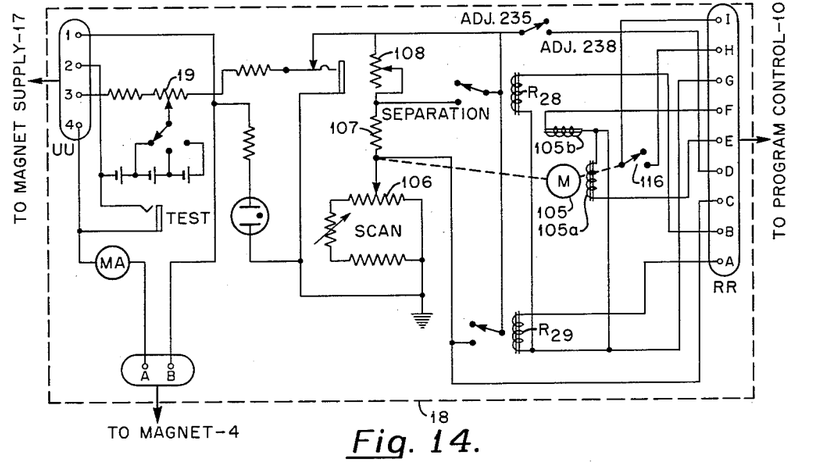
FIGURE 14 is a schematic of the magnet scan circuit.

The magnet scan control 18, shown in FIGURE 14, controlled from program control 10 and supplied from the magnet supply 17, includes a scan motor 105, which operates limit switch 116, and drives the adjustable contact of a potentiometer 106 which is connected in series with resistors 107 and 108 to form a portion of the voltage divider controlling the magnet current. Relays $R_{28}$ and $R_{29}$ serve to short out portions of the voltage divider or separation resistance to shift the ion beams relative to the collectors. The voltage divider is then bridged across the circuit from the magnet supply to the magnet.

Figure 7:
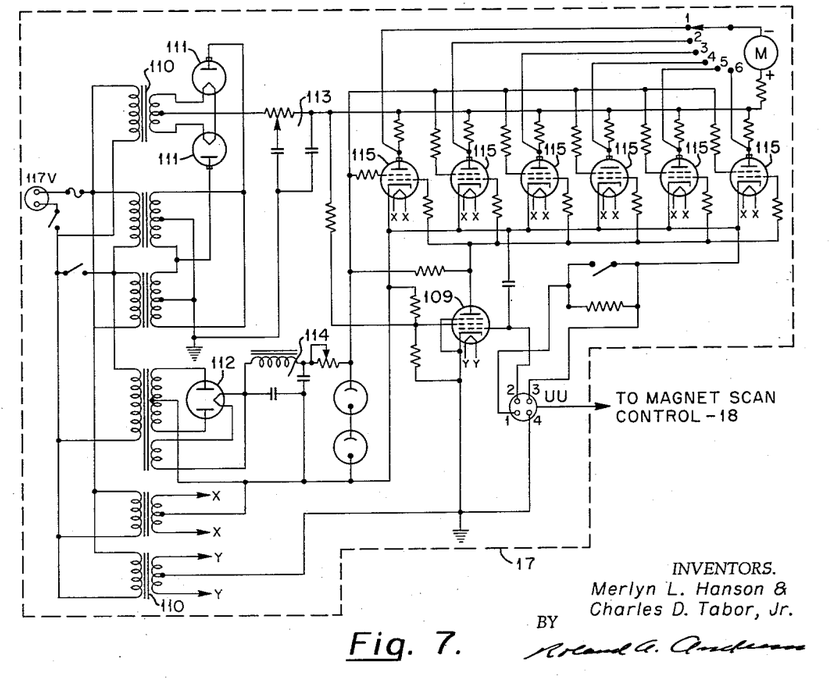
FIGURE 7 is a circuit diagram of the magnet supply.

The magnet supply of FIGURE 7 comprises a voltage regulator tube 109, a series of power transformers 110, rectifiers 111, 111, 112, filters 113, 114 and a series of power tubes 115 connected in parallel and controlled by the voltage regulator tube 109.

The coupling between the magnet scanning control 18 of FIGURE 14 and the magnet supply 17 of FIGURE 7 is best understood from an examination of FIGURE 8. When relay $R_{28}$ closes, the control grid of voltage regulator tube 109 of magnet supply 17 becomes more negative and the plate more positive, and being coupled to the grid of tube 115, causes increased current flow therethrough and increased circuit flow through the magnet coils 116, 116. This continues until equilibrium is reached and the drop from the slider of potentiometer 19 to ground assumes its previous value.

Figure 9:
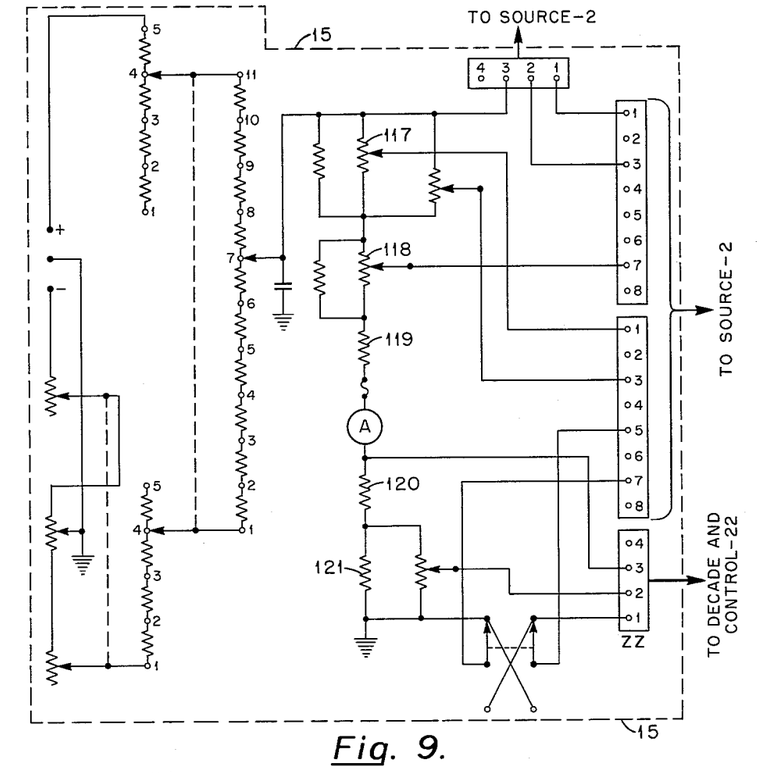
FIGURE 9 is a schematic of the accelerating voltage control panel.

The ionization and acceleration voltage supply 15, shown in FIGURE 9, is coupled through the decade and control 22 to the program control 10. It comprises a group 117–121 of series connected resistor to form a voltage divider to provide potential for the acceleration and other high voltage plates as well as the focusing plates of the spectrometer source 2 to either center the beam or to deflect it into the source for grounding. The former is referred to as "peaks-in" and is the condition during normal operation, while the latter is called "peaks-out," and exists during the time while the zero of the recorder is being determined. Control is effected through the peaks-in-peaks-out switch 122 of the decade and control 22 of FIGURE 15, and relays $R_8$, $R_9$ of the program control 10.

Figure 17:
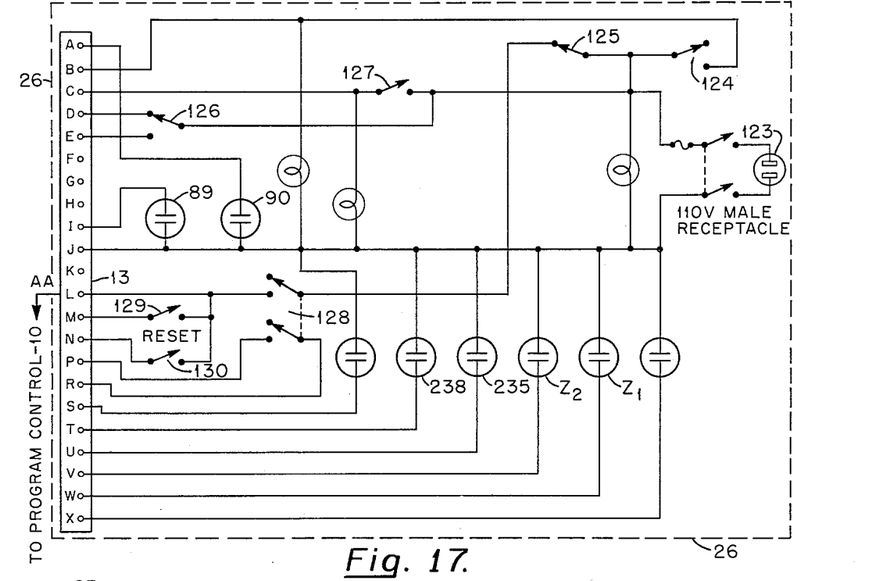
FIGURE 17 is a schematic of the master control system.

The master control system 26 coupled to the program control system 10 is shown in FIGURE 17 and includes the source 123 of 110 volt A.C. power for the system, the "start" switch 124 and the "stop" switch 125, sample control switch 126, amplifier switch 127, intensity control switch 128, and advance and reset switches 129 and 130. In addition, there are numerous lights to indicate the state of operations of the system.

In its operation, the start switch 124 of the master control system 26 of FIGURE 17 is closed. This energizes relay $R_8$ of the program control 10 of FIGURE 16 if the intensity control switch 128 is in automatic position. Gas from the process stream comes in through line 14, shown in FIGURE 11, and with valves 27, 29, 30 and 28 open and valves 32 and 33 closed, the gas flow is through lines 14', 14'', past the leak 31. To trap a sample manually prior to closing switch 124, switch 126 of the master control system 26 is closed to the "trapped" or lower position which energizes solenoid valve 34 and operates air motor valves 29, 30 to closed position, thereby trapping a quantity of gas in the loop. It also opens the by-pass valve 32 to permit the continuous flow of stream gas while the sample is trapped in the loop during the cycle. Energizing of relay $R_8$ through its contacts $R_{8C}$ and $R_{8D}$ switches control of manifold solenoids from manual switch 126 of master control system 26 to automatic switch relay contacts $R_{14C}$. Contacts $R_{8E}$ are the holding contacts for relay $R_8$ and supply power to the automatic functions until the circuit is broken by the manual opening of "stop" switch 125.

The sequence is then started by manual closing of the advance switch 129 in the master control system 26 which completes the circuit to the stepping solenoid 50 of FIGURE 16 and starts the movement of the stepper. During normal 4½ minute intensity control while the ion source and beam are being stabilized within acceptable limits, the stepper, which is connected to power, moves across fixed contacts 1' to 8', taking ½ minute for each contact, and applying power to relay $R_5$, coupled to the fixed contacts, to energize it. Contacts $R_5A$ open the intensity control disabling relay $R_{40}$ in the intensity servo and compensator 9 of FIGURE 13. Contacts $R_5B$ open, stopping the chart drive motor 78 of the recorder 23 of FIGURE 18. The closing of contacts $R_5C$ energizes relay $R_{28}$ of the magnet scan control 18 of FIGURE 14 which shorts resistor 108 so as to place the magnetic sweep in the valley between the $U^{235}$ and $U^{238}$ peaks. The ion beam is in the normal peaks-in position.

Near the end of the intensity control period when the stepper reaches contact 9', the intensity control is deactivated but the pressure normally remains sufficiently constant to complete the cycle. At contact 9', relay $R_6$ coupled thereto, is energized and acts to maintain the intensity control functions through the closing of contacts $R_6A$ which keep relay $R_5$ energized. Contacts $R_6B$ close a circuit that energizes relay $B_7$. Contacts $R_7A$ complete the circuit of the counterclockwise winding of the scan motor 105 of FIGURE 14 to drive the moving contact on potentiometer 106 down.

The closing of contacts $R_7B$ has no effect except during emergency sweep back.

When the stepper passes from contact 9' to contact 10', relays $R_5$, $R_7$, $R_{28}$ and $R_{40}$ are deenergized, and relays $R_9$ and $R_{20}$ are energized, and $R_{10}$ is also energized if the standardizer 24 is not already at zero. Contacts $R_9A$ throw "peaks-out" by completing a circuit through the decade and control 22 of FIGURE 15 to the ionization and accelerating voltage supply 15 of FIGURE 9 to apply 300 volts on a beam-centering plate of the source 2. This is done to preclude the possibility of the ion beam falling on the collector plates while zero is measured on the recorder. Shifting of contacts $R_{9B}$ deenergizes relay $R_{24}$ of the decade and control 22, of FIGURE 15, connecting the recorder 23 into the measuring circuit through contacts $R_{24A}$ and $R_{24B}$ to record the position of electrometer zero, since the peaks to be measured are referred to zero. If zero is off the chart center line, a correction must be made in the subsequent peak reading. Lower contacts $R_{9B}$ complete a circuit through the winding of $R_{26}$ in the decade and control 22 and energize it and remove the bucking battery 74 from the circuit and prevent it from deflecting the recorder during the zero measurement.

Relay $R_{10}$ is energized through connector NN in order to activate the standardizer, and indicator $Z_1$ in the master control system 26, is likewise energized, since connected to the winding of that relay. When the standardizer is not at zero, contacts $SwC$ are made, completing the circuit for relay $R_{10}$. The shifting of contacts $R_{10A}$ extinguishes indicator $Z_2$ in the main control system 26, and completes a circuit from the stepper through contacts $R_{4B}$ to motor winding 25a to rotate standardizer motor 25 of FIGURE 19 back to zero. Contacts $R_{10B}$ shift energizing relay $R_{24}$ in the decade and control 22 of FIGURE 15, which removes the recorder 23 from the measuring circuit and grounds it, while the standardizer is being run down to zero. The opening of contacts $R_{10C}$ deenergizes relay $R_{26}$ in the decade and control 22 to complete the circuit for bucking battery 74.

When standardizer 24 reaches "zero," cam C of FIGURE 6 releases contacts $SwC$ of FIGURE 19, which open the circuit and deenergize relay $R_{10}$ of the program control 10. Shifting of contacts $R_{10A}$ lights indicator $Z_2$ in the master control system 26 of FIGURE 17. Shifting of contacts $R_{10B}$ energizes relay $R_{27}$ of the decade and control 22 of FIGURE 15, removing the amplifier 21 from the measuring circuit so that it will not affect the zero reading of the recorder 23. Closing of contacts $R_{10}C$ of program control 10 of FIGURE 15 again energizes relay $R_{26}$ of decade and control 22 of FIGURE 15 and removes the bucking battery 74 from its circuit.

The stepper then moves to contact 11' to start the $U^{235}$ period. Relays $R_9$ and $R_{20}$ are deenergized and the ion beam is brought into the "peaks-in" position, permitting it to fall upon the collector assembly of the mass spectrometer. Relays $R_{11}$ and $R_{22}$ of program control 10 of FIGURE 16 and indicator "235" in the master control system 26 of FIGURE 17, are all energized.

Contacts $R_{11}A$ open and deenergize relay $R_{27}$ in the decade and control 22 of FIGURE 15, closing the circuit connecting the Brown amplifier 21 into the bridge circuit. Switching of contacts $R_{11}B$ deenergizes relay $R_{24}$ and energizes relay $R_{25}$ of the decade and control 22 of FIGURE 15 to switch the recorder 23 of FIGURE 18 into the measuring circuit and across the shunt resistor 73 to measure the large $U^{235}$ peak. Switching of contacts $R_{11}C$ deenergizes timer-motor 135, places power at the open contacts of anti-clockwise switch $SwF$ in the standardizer 24 of FIGURE 19, and energizes relay $R_{12}$ whose contacts complete a circuit to the clockwise winding of scanning motor 105 of magnetic scan control 18 of FIGURE 14, to drive the moving contact of potentiometer 106 and sweep the $U^{235}$ beam across the slit in upper collector 3a of the mass spectrometer. The closing of contacts $R_{11}D$ energizes relay $R_{16}$ to prepare for the possibility of a one-minute intensity control period if that should prove necessary. When the contacts of $R_{16}$ are closed, the switches of both cams 66, 67 of the timer, are capable of energizing the stepping solenoid so that it will move the stepper eight positions in one minute. Contacts $R_{16A}$ and $R_{16B}$ both form a holding circuit so that once relay $R_{16}$ is energized, it can be denergized only by the opening of contacts $R_{13C}$ when a $U^{238}$ delay period occurs, or by the opening of contacts $R_{15C}$ when an emergency sweep occurs, or by the shifting of the contacts of the switch of timer cam 66 at the end of one rotation. The closing of contacts $R_{11E}$ completes a circuit through normally closed contacts $R_{4B}$ to winding 25a of the standardizer motor 25 of FIGURE 19.

The closing of the contacts of relay $R_{22}$ maintains the power on timer motor 135 through the contacts of the switch operated by cam 66, causing it to continue rotation until the switch roller has risen out of the depression in the stepping cam 66 and assumed a normal actuated condition, removing power from contacts of relay $R_{22}$ and stepping solenoid 50. If the timer motor 135 stopped as soon as contacts $R_{11C}$ were shifted with the switch on the thirty-second cam 66 made, the switch would keep power on the stepping solenoid 50, and prevent the next step in the cycle from occurring.

As the ion beam sweeps across the slit in collector 3a and falls upon collector 3b increased signal from amplifier 20 is fed through the decade and control 22 of FIGURE 15 to the amplifier 21 of FIGURE 16 and then through the program control 10 to the standardizer 24 of FIGURE 19. This signal is opposed by the potential of the slide wire 76 of the standardizer supplied by bucking battery or source 74 of the decade and control 22 of FIGURE 15, but until the peak of the ion beam is reached, the signal increases and the standardizer is moved up increasing the bucking voltage applied to the amplifier 21. After reaching the peak, the bucking voltage exceeds the ion current signal and the standardizer motor 25 rotates in a counterclockwise direction. Cams E, D or F would then be operated to energize relays $R_3$, $R_2$, and $R_1$ or any two of them, of program control 10 of FIGURE 16, and this, in turn, would energize relay $R_4$. Opening of contacts $R_4A$ deenergizes winding 25b of standardizer motor 25, and shifting of contacts $R_4B$ deenergizes motor winding 25a. In lower contact position it completes the circuit to power from pin G of connector NN through contacts SwA and SwB of standardizer 24 of FIGURE 19, if the intensity is at a proper level, to pin E of connector NN of standardizer 24, and then to the stepping solenoid 50 of program control 10 of FIGURE 16, moving the wiper to contact 12′, and completing the measurement of the $U^{235}$ peak.

However, if the intensity is too low, i.e., 5 percent or more below a predetermined value such as 812 millivolts, the $U^{235}$ peak will not be measured but switch SwA of standardizer 24 of FIGURE 19 will be depressed by cam A and shifted to apply the power to pin D of connector NN which is fed to program control 10 of FIGURE 16 to energize relay $R_{18}$ and counterclockwise field $41a$ of compensator motor 41 of the intensity servo and compensator 9 of FIGURE 13 connected to the winding of relay $R_{18}$. Closing of contacts $R_{18}$A completes a holding circuit for the relay through the five-second timer 68. Closing of contacts $R_{18}$B energizes timer 68 and energizes reset solenoid 88 by closing a circuit through switch Sw22 in the intensity servo and compensator 9 of FIG. 13 to relay $R_{15}$ of the program control 10 of FIGURE 16. The closing of contacts $R_{15}$ energizes relay $R_{21}$, removing the power from the stepper and completing a circuit to apply power to reset solenoid 88. Removal of power from the stepper, which is on contact 11′, deenergizes relays $R_{11}$ and $R_{22}$, and extinguishing the $U^{235}$ indicator, however, relay $R_{16}$ remains energized through the holding contact $R_{16A}$. The reset solenoid 88 returns the stepper to contact 1′, and the deenergizing of relay $R_{11}$ breaks the circuit to the scanning motor 105 of FIGURE 14 by deenergizing relay $R_{12}$.

The sequence is then commenced all over again on a one-minute intensity control period with the stepper traversing contacts 1′ through 9′ in one minute. This fast stepping is accomplished by utilizing both stepping cams 66, 67 mounted on a single shaft and driven by timer 135 rotating at 2 r.p.m. to send out a whole series of impulses. Cam 66 with a single indentation in its circumference, operates a switch to move the stepper one step per half minute except during the $U^{235}$ and one-minute intensity control periods. Cam 67 with seven circumferential indentations, none of which are angularly coincident with the indentation on cam 66, operates a switch 15 seconds after the other switch and actuates it six additional times at spaced intervals prior to the next operation of the switch actuated by cam 66 to send a series of impulses to which stepping solenoid 50 responds each time. Thereafter, the sequence proceeds through the measurement of the $U^{235}$ peak in the usual manner.

In the alternative, if the intensity is too high, i.e., 5 percent or more above a predetermined value such as 812 millivolts switch SwA of standardizer 24 of FIGURES 6 and 19 will be in the indent of the cam A and switch SwA will be on contact SwAA and switch SwB will be engaged by the short raised portion of cam B and be depressed so that switch SwB will close contact SwBB feeding power to pin F of connector NN energizing relay $R_{17}$ of program control 10 of FIGURE 16 and clockwise field $41b$ of compensator motor 41 of the intensity servo and compensator 9 of FIGURE 13. Contacts $R_{17}$A upon closing provide a holding circuit through timer 68. Closing of contacts $R_{17}$B energize timer 68 and energize the reset solenoid 88 in the manner described above in connection with the operation of relay $R_{18}$ where the intensity level was too low. The subsequent one-minute intensity period and measurement of the $U^{235}$ peak proceeds in a manner similar to that described above where the low intensity situation was encountered.

The use of the five-second timer 68 in both instances above limits the angular rotation of the shaft of the compensating motor 41 of FIGURE 13 to 30° for each operation. This permits the acceptance level to be raised or lowered by a predetermined fixed amount each time until the $U^{235}$ signal has been accepted and measured.

An emergency situation requiring repetition of the original sequence occurs when a $U^{235}$ peak of a predetermined value such as at least 600 millivolts does not appear within the previously determined scan range. In that case, no measurement of the $U^{235}$ peak is made, but the scan motor 105 of FIGURE 14 continues to rotate until it reaches and closes limit switch 116 at about 960 ohms. This completes a circuit through pin H of connector RR and energizes relay $R_{19}$ in the program control 10 of FIGURE 16. The closing of contacts $R_{19}$A completes a holding circuit through contacts $R_{20}$A for relay $R_{19}$. The closing of contacts $R_{19}$B energizes relay $R_{7}$ and the closing of contacts $R_{7}$A completes a circuit through pin E of connector RR to the counterclockwise winding of scanning motor 105 of the magnet scan control 18 of FIGURE 14, opening the limit switch 116 and moving the resistor contact back down the potentiometer 105. The shifting of contacts $R_{7}$B energizes relay $R_{15}$ and in turn relay $R_{21}$. The arrangement for energizing relay $R_{19}$ through contacts $R_{7}$B was employed since it presents a way of energizing relay $R_{15}$ for only a short period. If relay $R_{19}$ were energized directly by limit switch 116 of the scan motor 105 of FIGURE 14, relay $R_{15}$ would need to be energized by relay $R_{19}$ and would remain closed for 4½ minutes. In the above arrangement, the limit switch is tied to contacts $R_{7}$B so that when it has energized relay $R_{19}$, contacts $R_{19}$B are closed energizing relay $R_{7}$, switching contacts $R_{7}$B to open the circuit to relay $R_{19}$ and close a circuit from limit switch 116 to relay $R_{15}$. Since relay $R_{7}$ also reverses the scanning motor 105, as mentioned above, the limit switch 116 opens after a few seconds so that relay $R_{15}$ is energized for a period less than that of relay $R_{21}$. The opening of contacts $R_{19}$C disrupts the holding circuit for relay $R_{16}$ and removes the power supply for the switch of stepping cam 67, restoring the 4½ minute intensity control period so that the magnet scanning pot operated by the 2 r.p.m. motor 105 of FIGURE 14 will be given time to rotate the ten-turn pot back to a starting point and the normal sequence for measuring the $U^{235}$ peak can proceed in the manner described above. Relay $R_{20}$ opens the holding circuit of relay $R_{19}$ when zero period starts.

As previously indicated, when measurement of the $U^{235}$ peak is successfully completed, the stepper moves on to contact 12′. Relays $R_{11}$ and $R_{22}$ are deenergized, and relay $R_{13}$ of program control 10 of FIGURE 16, relay $R_{29}$ of magnet scan control 18 of FIGURE 14, and relay $R_{23}$ of recorder 23 of FIGURE 18, and $U^{238}$ pilot light in the master control system 26 of FIGURE 17 are all energized. Closing of contacts $R_{13A}$ completes a holding circuit through contacts $R_{14B}$. The opening of contacts $R_{13B}$ deenergizes relay $R_{24}$ of the decade and control 22 of FIGURE 15 to switch the recorder 23 of FIGURE 18 into the measuring circuit. Opening of contacts $R_{13C}$ breaks the holding circuit for relay $R_{16}$ and deactivates the timing cam 67 and its switch, returning the stepper to the control of the single timing cam 66 and its switch. The closing of the contacts of relay $R_{29}$ of FIGURE 14 shorts the entire separation resistance including resistors 107, 108 to reposition the ion beams with respect to the slit in control collector $3a$ so that the peak of the $U^{238}$ beam crosses the slit in control collector $3a$ and the beam is alined therewith at a point just beyond the peak as shown in FIGURE 4. The deenergizing of relay $R_{11}$ deenergizes relay $R_{25}$ of the decade and control 22 of FIGURE 15 through the shift of contacts $R_{11B}$ and places the recorder 23 across the bridge including decade 71 and resistors 72 and 73. The shifting of the contacts of relay $R_{23}$ in the recorder 23 of FIGURE 18 completes the circuit to permit the condenser 82 to discharge through the printing solenoid 80 to stamp the time on the chart. During this one-half minute interval neither the scanning motor 105 of FIGURE 14 nor the standardizer 24 of FIGURE 19 is in operation. The delay is introduced in order to permit the focusing magnet 4 of the mass spectrometer to stabilize after the shorting of the voltage divider 107, 108 in FIGURE 14.

When the stepper passes on to contact 13', relays $R_{13}$, $R_{23}$ and $R_{29}$ remain energized under the influence of the holding circuit through contacts $R_{13A}$ and $R_{14B}$, so that the recorder 23 of FIGURE 18 remains in the measuring circuit, and the stepper solenoid continues under the influence of cam 66. Relay $R_7$ is energized, closing contacts $R_{7A}$ which energizes the counterclockwise winding 105a of scan motor 105 of FIGURE 14 through pin E of connector RR, to sweep the peak of the $U^{238}$ beam back across the slit in control collector 3a so that it may be measured by recorder 23.

Then the stepper moves from contact 13' to contact 14' to deenergize relay $R_7$ and energize relay $R_{12}$ and complete a circuit through the contacts thereof through pin F of connector RR to the clockwise winding 105b of scan motor 105 of FIGURE 14 to drive the moving contact of potentiometer 106 and sweep the $U^{238}$ beam across the slit in collector 3a.

As the stepper moves on successively across contacts 13' through 17', standardizer motor 25 remains deenergized and the beam is swept back and forth across the slit in collector 3a since contacts 13', 15' and 17' are electrically connected and contacts 14' and 16' are connected. The $U^{238}$ peak is measured each time the beam is swept across, making a total of five measurements of the $U^{238}$ peak. Figure 10 shows a plot of $U^{235}$ measurement followed by a series of $U^{238}$ measurements obtained in the sequence described above, together with an extrapolation line connecting the $U^{238}$ peak points with the $U^{235}$ plot. Since the intensity drift is very near linear, it is possible to extrapolate back to the time of the $U^{235}$ plot and ascertain the $U^{238}$ peak at that time, as indicated by the straight line joining the $U^{238}$ peaks and intersecting the plot of the $U^{235}$ scan at $a'$, which is the analysis point.

When the stepper moves on to contacts 18' and 19', which are tied together, relay $R_{14}$, the sample changing relay, is energized. The opening of contacts $R_{14A}$ breaks the circuit through pin 2 of connector QQ to the chart drive motor 78 in the recorder 23 of FIGURE 18, stopping the movement of the chart. Shifting of contacts $R_{14B}$ breaks the holding circuit for the relays $R_{13}$, $R_{23}$ and $R_{29}$ through contacts $R_{13A}$. The closing of contacts $R_{13B}$ completes a circuit through pin B of connector BB to energize relay $R_{24}$ in the decade and control circuit 22 of FIGURE 15 to ground the recorder 23 of FIGURE 18. Shifting of contacts $R_{14C}$ deenergizes sample trapping solenoid 34a and energizes solenoid 35a of FIGURE 11 through pins B and C of connector YY, closing valve 32 and opening valves 29, 30 to release the trapped sample in the sample trapping system 13 and permits process gas to flow in the loop 14, 14', and 14''. In addition, the "sample trapped" indicator 89 is extinguished and "sample flowing" indicator 90 is energized in the master control system 26 of FIGURE 17 through pins I, A, of connector AA.

When the new sample has been drawn from the process line and the stepper has moved on to contact 20', relay $R_{14}$ is deenergized, energizing the sample trapping solenoid 34a and deenergizing sample flowing solenoid 35a to trap a new sample through the shifting of contacts $R_{14C}$. Relays $R_{15}$, $R_{21}$ and reset solenoid 88 are all energized, removing power from the stepper arm and initiating a resetting of the system in the manner heretofore described, and for further reference to the sequence of operations, the attached chart is provided.

PROGRAM CHART

| Position | Function | Recorder Position [1] | Chart Drive | Scanning Motor | Separation Resistance Shorted | Intensity Control | Reference Voltage |
|---|---|---|---|---|---|---|---|
| 1–8 | Intensity control | G | Off | Off | Separation control only. | Operable | On. |
| 9 | do | G | Off | ccw | do | do | On. |
| 10a | Zero 1 | G | Off | Off | None | Disabled | On. |
| 10b | Zero 2 | D | On | Off | do | do | Off. |
| 11 | U-235 scan | S | On | cw | do | do | On. |
| 12 | U-238 delay | D | On | Off | All | do | On. |
| 13 | U-238 scan | D | On | ccw | do | do | On. |
| 14 | do | D | On | cw | do | do | On. |
| 15 | do | D | On | ccw | do | do | On. |
| 16 | do | D | On | cw | do | do | On. |
| 17 | do | D | On | ccw | do | do | On. |
| 18, 19 | Sample Change | G | Off | Off | None | do | On. |
| 20 | Reset | G | Off | Off | do | do | On. |

| Position | Brown Amplifier | Peaks In-Out | Program Timer-Motor | Time Printer | Sample Status | Standardizer Motor | Counter-clockwise Blocking Relays |
|---|---|---|---|---|---|---|---|
| 1–8 | Out | PI | On | | Trapped | Disabled | Disabled. |
| 9 | Out | PI | On | | do | do | Do. |
| 10a | In | PO | On | | do | Energized | Do. |
| 10b | Out | PO | On | | do | Disabled | Do. |
| 11 | In | PI | Off | | do | Energized | Energized. |
| 12 | Out | PI | On | Print | do | Disabled | Disabled. |
| 13 | Out | PI | On | | do | do | Do. |
| 14 | Out | PI | On | | do | do | Do. |
| 15 | Out | PI | On | | do | do | Do. |
| 16 | Out | PI | On | | do | do | Do. |
| 17 | Out | PI | On | | do | do | Do. |
| 18, 19 | Out | PI | On | | Flowing | do | Do. |
| 20 | Out | PI | On | | Trapped | do | Do. |

[1] D=coupled to decade; S=coupled across shunt; G=grounded.

Having thus described our invention, we claim:

1. An automatically operated mass spectrometer comprising a spectrometer having an ion source, an ion beam deflecting magnet, and upper and lower collectors, means for isolating and feeding a gas sample to the source, means responsive to signal from the upper collector for controlling the flow of sample to the source, a control circuit coupling the lower collector to the magnet to sweep the ion beam across the collector, means coupled to the lower collector and responsive to ion current for setting up a reference voltage corresponding thereto, and a measuring device coupled to the lower collector and the reference voltage means for comparing signals.

2. An automatically operated mass spectrometer comprising a spectrometer having an ion source, an ion beam deflecting magnet, an upper slotted collector and a lower collector, means for isolating and feeding a gas sample to the ion source, an ion intensity control circuit coupled to the upper collector and responsive to ion current to control the flow of sample to the source, means coupling the lower collector to the magnet and responsive to signals therefrom for controlling the supplying of power to the magnet for sweeping the ion beams across the collectors, a measuring circuit coupled to the lower collector for measuring ion current, and a control circuit coupled to the measuring circuit and responsive to ion current signal to set up a reference voltage equal to the ion current signal to balance against signal in the measuring circuit.

3. A system for controlling the operation of a mass spectrometer having an ion source, an ion beam deflecting magnet, and upper and lower collectors comprising a program control for setting up a sequence of operations, means for isolating a gas sample to be examined, an amplifier coupled to the upper collector and responsive to ion current signal for controlling the sample flow to the ion source, means responsive to the program control for altering the current to the magnet to sweep selected ion beams across the lower collector, a control circuit responsive to signal from an ion beam as it impinges on the lower collector to set up a reference voltage for the other ion beams, and a recorder coupled to the lower collector and responsive to the control circuit for measuring the ion current signals.

4. A system for controlling the operation of a mass spectrometer comprising a mass spectrometer having an ion source, a beam deflecting magnet, and plural signal collectors, means for isolating gas samples to be fed to the source, an ion intensity control circuit coupled to one of said collectors and responsive to ion current signal for controlling the sample flow to the ion source, means for applying and regulating the flow of current to the magnet to sweep selected ion beams across the collectors, a recorder coupled to another of said collectors for recording the magnitude of the ion currents, and a control circuit coupled to said last named collector and responsive to signal therefrom for setting up a reference voltage corresponding thereto, and means for applying a predetermined portion of the reference voltage to the recorder for balancing against subsequent measurements of ion current signals from the collector.

5. A system for the automatic control of the operation of a mass spectrometer comprising a mass spectrometer having an ion source, a beam deflecting magnet, and control and signal collectors, means for feeding a gas sample to the ion source, an ion intensity control circuit coupled to the control collector for controlling the sample flow to the source, means for applying and controlling the current flow to the magnet to sweep selected ion beams across the collectors, a recorder coupled to the signal collector to measure the ion current signals therefrom, and a control circuit coupled to the signal collector and responsive to ion current signals for determining the peak of a selected beam and applying a signal to the magnet control means to shift the beam.

6. A system for the automatic control of the operation of a mass spectrometer comprising a mass spectrometer having an ion source, a beam deflecting magnet, and control and signal collectors, means for feeding a gas sample to the source, an ion intensity control circuit coupled to the control collector and responsive to ion current signals therefrom for controlling the sample flow to the source, means for applying and controlling the current flow to the magnet to sweep selected ion beams across the collectors, a recorder coupled to the signal collector to measure the ion current signals therefrom, and a control circuit coupled to the signal electrode and responsive to ion current signals for determining the peaks of selected ion beams and applying a signal to the magnet control means for shifting the ion beam, and for setting up a reference voltage for application to the recorder during the measurement of subsequent ion beams.

7. A system for the automatic control of a mass spectrometer comprising a mass spectrometer having an ion source, an ion beam deflecting magnet, and plural collectors, means for isolating and feeding a gas sample to the source, an intensity control circuit coupled to one of said collectors and responsive to signals therefrom for regulating the flow of gas sample to the source, a program control for setting up the sequence of operations, means coupled to the program control for controlling the supply of current entering the magnetic field for selecting the ion beams and sweeping them across the collectors, means coupled to another of said collectors for measuring ion current signals, and means coupled to said last named collector and responsive to ion current signals for determining the magnitude of the peak of an ion beam and supplying a signal to the program control for actuating the ion intensity control circuit to alter the magnitude of the ion beam.

8. A system for the automatic control of a mass spectrometer comprising a mass spectrometer having an ion source, an ion beam deflecting magnet, and plural collectors, means for isolating and feeding a gas sample to the source, an intensity control circuit coupled to one of said collectors and responsive to signals therefrom for regulating the flow of gas sample to the source, a program control for setting up the sequence of operations, means coupled to the program control for controlling the supply of current entering the magnetic field for selecting the ion beams and sweeping them across the collectors, means coupled to another of said collectors for measuring ion current signals, and means also coupled to said last named collector and responsive to ion current signals for locating and determining the magnitude of the peak of an ion beam and for applying a signal to the program control to actuate the control of the magnet current supply to shift the ion beam and set up and maintain a reference voltage for the said measuring means during subsequent ion beam measurements.

9. A system for the automatic control of the operation of a mass spectrometer comprising a mass spectrometer having an ion source, an ion beam deflecting magnet, and plural collectors, means for isolating and feeding gas samples to the source, an ion intensity control circuit coupled to one of the collectors for controlling sample flow to the source, a program control for initiating a sequence of operations for the mass spectrometer, a source of current for the magnet coupled to the program control for deflecting the ion beams to sweep the collectors, a recorder coupled to another of said collectors for measuring ion current signals, and a standardizer also coupled to said last named collector and responsive to ion current signals to locate and determine the magnitude of the peak of an ion beam and apply a signal to the program control for altering the magnetic field and deflecting the ion beam, said standardizer also setting up a reference potential for application to said recorder during subsequent measurements of other ion beams.

10. A system for the automatic control of the operation of a mass spectrometer comprising a mass spectrometer having an ion source, an ion beam deflecting magnet, and plural collectors, means for isolating and feeding gas samples to the source, an ion intensity control circuit coupled to one of the collectors for controlling sample flow to the source, a program control for initiating a sequence of operations for the mass spectrometer, a source of current for the magnet coupled to the program control for deflecting the ion beams to sweep the collectors, a recorder coupled to another of said collectors for measuring ion current signals, and a standardizer also coupled to said last named collector for determining when the selected ion beam is out of the selected range and applying a signal to the program control to initiate a new sequence of operations.

11. A system for the automatic control of the operation of a mass spectrometer comprising a mass spectrometer having an ion source, an ion beam deflecting magnet, and plural collectors, means for isolating and feeding gas samples to the source, an ion intensity control circuit coupled to one of the collectors for controlling sample flow to the source, a program control for initiating a sequence of operations for the mass spectrometer, a source of magnet current for deflecting the ion beams and for sweeping the ion beams across the collectors coupled to the program control for initiating a signal to the program control when the magnet current control reaches its upper extremity to initiate a new sequence, and a standardizer coupled to a second collector and responsive to ion current signals to locate and determine the magnitude of the peak of an ion current beam and apply a signal to the program control for altering the magnetic field and deflecting the ion beam, and for setting up a reference potential for application to a recorder during subsequent measurements of ion beams.

References Cited in the file of this patent

UNITED STATES PATENTS

| | | |
|---|---|---|
| 2,331,190 | Hipple | Oct. 5, 1943 |
| 2,714,667 | Burney et al. | Aug. 2, 1955 |